(12) United States Patent
Burton et al.

(10) Patent No.: US 8,037,326 B2
(45) Date of Patent: Oct. 11, 2011

(54) POWER CONTROL UNIT WITH DIGITALLY SUPPLIED SYSTEM PARAMETERS

(75) Inventors: Edward A. Burton, Hillsboro, OR (US);
Robert J. Greiner, Beaverton, OR (US);
Anant S. Deval, Beaverton, OR (US);
Douglas R. Huard, Portland, OR (US);
Jeremy J. Shrall, Portland, OR (US);
Arun R. Ramadorai, Beaverton, OR (US); Benson D. Inkley, North Plains, OR (US); Martin M. Chang, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 12/698,729

(22) Filed: Feb. 2, 2010

(65) Prior Publication Data

US 2010/0138683 A1 Jun. 3, 2010

Related U.S. Application Data

(63) Continuation of application No. 11/434,451, filed on May 12, 2006, now Pat. No. 7,685,441.

(51) Int. Cl.
*G06F 1/00* (2006.01)
*G06F 1/10* (2006.01)
(52) U.S. Cl. ......... 713/300; 713/340; 327/538; 327/540
(58) Field of Classification Search .................. 713/300, 713/340; 327/538, 540
See application file for complete search history.

(56) References Cited

U.S. PATENT DOCUMENTS

| | | | |
|---|---|---|---|
| 5,285,147 A | 2/1994 | Rashid | |
| 5,727,208 A | 3/1998 | Brown | |
| 6,519,707 B2 | 2/2003 | Clark et al. | |
| 6,677,809 B2 | 1/2004 | Perque et al. | |
| 6,697,952 B1* | 2/2004 | King | 713/300 |
| 7,027,944 B2 | 4/2006 | Tabaian et al. | |
| 7,366,929 B1 | 4/2008 | Mimberg | |
| 7,382,676 B2 | 6/2008 | Ballweber et al. | |
| 7,506,184 B2 | 3/2009 | Burton et al. | |
| 2001/0017595 A1 | 8/2001 | Cliff et al. | |
| 2003/0206050 A1* | 11/2003 | Huard et al. | 327/540 |
| 2004/0150928 A1 | 8/2004 | Goodfellow et al. | |
| 2005/0039059 A1 | 2/2005 | Park | |
| 2005/0200344 A1 | 9/2005 | Chapuis | |
| 2005/0201188 A1* | 9/2005 | Donze et al. | 365/232 |
| 2005/0289366 A1* | 12/2005 | Reilly | 713/300 |

(Continued)

OTHER PUBLICATIONS

Non-Final Office Action mailed Dec. 11, 2008 for U.S. Appl. No. 11/434,451.

(Continued)

*Primary Examiner* — Vincent Tran
(74) *Attorney, Agent, or Firm* — Guojun Zhou (57) ABSTRACT

Methods and apparatuses provide voltage regulation for a processor. Control or configuration parameters for a voltage regulator (VR) are provided digitally over a configuration bus to a VR controller. The parameters may be provided directly from a storage element, or via a processing element or processor core. Based in whole or in part on the parameters, the VR controller provides an output control signal to affect a power output from a power converter to the processing element. In one embodiment, the VR controller is integrated onto the same IC as the processing element.

20 Claims, 4 Drawing Sheets

U.S. PATENT DOCUMENTS

| | | |
|---|---|---|
| 2006/0223578 A1 | 10/2006 | Conyers et al. |
| 2006/0284636 A1 | 12/2006 | Wright |
| 2007/0013080 A1 | 1/2007 | DiBene et al. |
| 2007/0070673 A1 | 3/2007 | Borkar et al. |
| 2007/0156370 A1* | 7/2007 | White et al. ............. 702/132 |
| 2007/0186128 A1 | 8/2007 | Rambo et al. |
| 2007/0266262 A1* | 11/2007 | Burton et al. ............. 713/300 |

OTHER PUBLICATIONS

Non-Final Office Action mailed Jun. 4, 2009 for U.S. Appl. No. 11/434,451, 13 pages.

Notice of Allowance, U.S. Appl. No. 11/434,451 Mailed Nov. 2, 2009, whole document.

\* cited by examiner

POWER CONTROL UNIT WITH DIGITALLY SUPPLIED SYSTEM PARAMETERS

CROSS-REFERENCE TO RELATED APPLICATIONS

This application is a Continuation Application of and claims priority to U.S. application Ser. No. 11/434,451, entitled "Power Control Unit with Digitally Supplied System Parameters", filed May 12, 2006 now U.S. Pat. No. 7,685,441.

FIELD

Embodiments of the invention relate to integrated circuits, and more particularly to power control in a processor.

BACKGROUND

Computing devices using microprocessors are increasingly subject to power constraints as the speed and performance of the microprocessors increases. There is an increased desire for increased performance per Watt. With high-speed microprocessors that operate in the Gigahertz range at lower than 1 V operating voltage with operating currents peaking into the hundreds of Amps, power constraints are generally considered essential.

Integrated circuits are generally powered from one or more direct current (DC) supply voltages provided from either batteries, a converted alternating current (AC) source, or some combination. The power is provided through pins, leads, bumps, or lands on the integrated circuit package. Traditionally, power to high-speed microprocessors is provided by high-efficiency, programmable DC-to-DC (switch-mode) power converters located near the integrated circuit package that embodies the microprocessor.

Such a power converter is referred to as a buck converter. Buck converters generally require a number of components that are size-wise rather large as compared to the integrated circuit to which they provide power. The power converters generally include pulsewidth modulators (PWMs), one or more power transistors (e.g., power field effect transistors (FETs)), filter and decoupling capacitors, and one or more large inductors and/or transformers. Power converters may include one or more phases to supply the full output current.

The output of the power supply can be adjusted for specific needs of the microprocessor, such as specific voltage or current needs. Traditionally, information necessary to account for the specific needs of the microprocessor is either not available to the power supply/voltage regulator, or the accessibility requires signal lines for each of the separate items of information.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" appearing herein may describe various embodiments and implementations of the invention, and do not necessarily all refer to the same embodiment. However, they are also not necessarily mutually exclusive. Descriptions of an overview of embodiments of the invention are provided below, followed by a more detailed description of certain details and implementations made with reference to the drawings.

A data source provides configuration parameters digitally to a voltage regulator controller. The parameters can be stored in a storage device separate from the voltage regulator controller and provided to affect a regulated output voltage. The parameters may be provided over a standard configuration bus or a proprietary bus. The parameters may be provided either directly to the voltage regulator controller from the storage device, or via a processor, which may include the processor being regulated, or a processor separately powered. The voltage regulator controller applies a power control plan/method/scheme to account for the received parameters. Some parameters may provide only a small effect to the voltage regulation, and some parameters may be completely ignored. In one embodiment, the received parameters are applied within the voltage regulator controller to override a default configuration (e.g., a parameter stored locally in the voltage regulator controller). Based on the application of the voltage regulation plan to the digitally received parameters, the voltage regulator controller outputs a control signal that is used to generate a regulated power signal to the processor core. In one embodiment, the voltage regulator controller is embedded in the same integrated circuit (IC) or on the same die as the processor.

Figure 1:
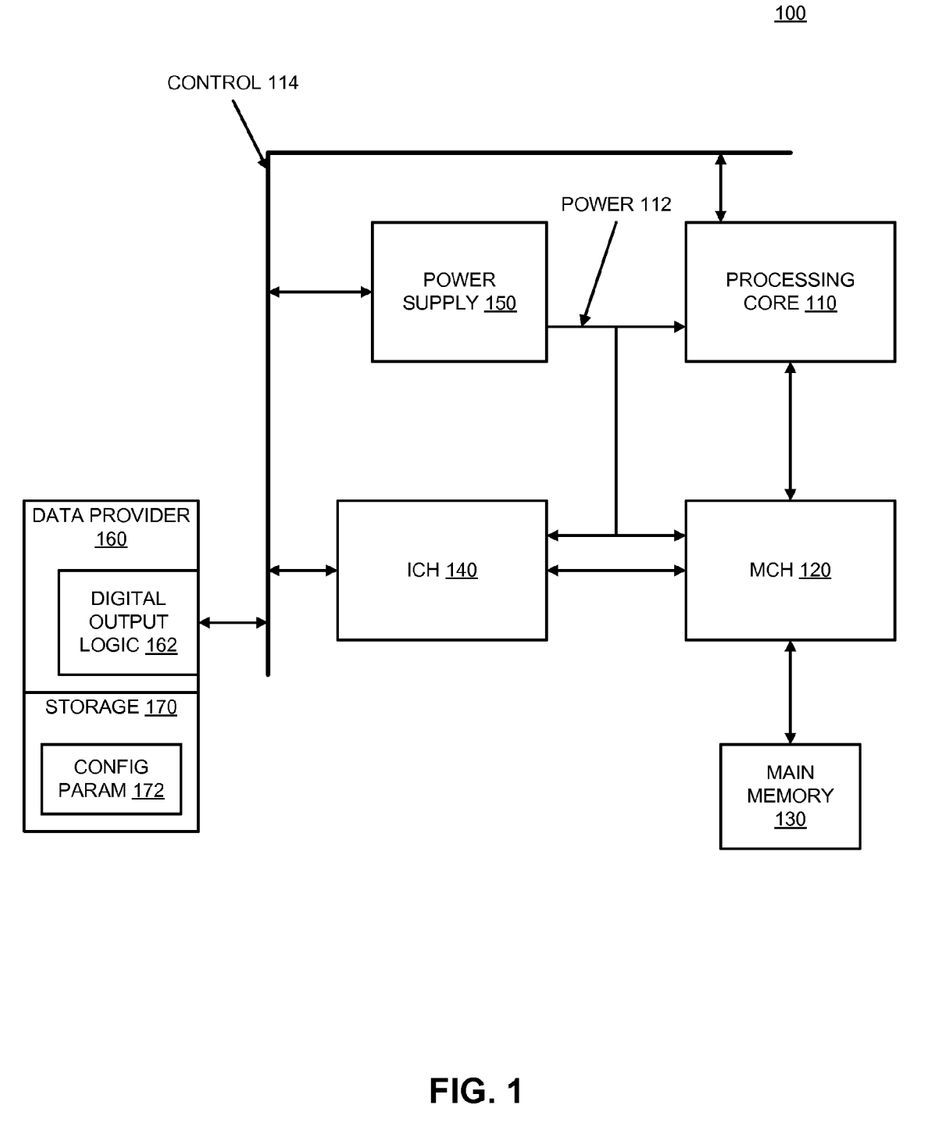
FIG. 1 is a block diagram of an embodiment of processing core coupled to a power supply.

FIG. 1 is a block diagram of an embodiment of processing core coupled to a power supply. Computer system 100 represents any of multiple different types of computer systems, which may include a desktop computer, a laptop computer, a server, a handheld device, or other computer system. System 100 may exist as a standalone unit, or may be implemented as a blade or other rack-mounted unit. System 100 includes processing core 110, which may be a processing unit of a processor, or one of a multiple cores of a multi-core processing unit. For example, in one embodiment, processing core 110 is a core of a multi-core processor (e.g., a PENTIUM processor) available from INTEL CORPORATION of Santa Clara, Calif. Other processors could be used. Processing core 110 may be a processing element of a graphics controller, an input/output (I/O) controller hub (ICH), a memory controller hub (MCH), a graphics and memory controller hub (GMCH), etc. As discussed in more detail below, processing core 110 includes sensors or circuits that provide information about the operation of processing core 110. The sensors provide information relevant to determining how to provide a regulated voltage signal (a power signal) to processing core 110. Processing core 110 includes the logic and circuitry to process (i.e., modify, read, operate on) data.

Processing core 110 is coupled to memory and typically to peripheral devices. In one embodiment, a chipset coupled to processing core 110 couples processing core 110 to the memory and/or peripheral devices. As used herein, coupling refers to providing an electrical, mechanical, and/or communicative connection. Thus, physical connectivity is not necessarily required. In an implementation in a single-core processor, certain elements of the interconnecting devices can be incorporated or integrated directly into the same package as processing core 110.

Processing core 110 is coupled to memory control hub (MCH) 120, which includes or interfaces with main system memory 130. MCH 120 can represent a standalone component, as well as the functionality or logic to provide memory control functionality within a single IC that includes the MCH functions on a common die with the processing core. Main memory 130 is generally static, although it may include one or more non-volatile elements (e.g., Flash). Main memory 130 may include any type of random access memory (RAM), for example, static RAM (SRAM), dynamic RAM (DRAM), synchronous DRAM (SDRAM), dual data-rate RAM (DDR-RAM), etc., or some combination. MCH 120 is coupled to processing core 110 via a bus, and coupled to input/output (I/O) control hub (ICH) 140 via a hub interface.

ICH 140 provides an interface from processing core 110 to peripheral devices. ICH 140 may connect to and/or manage a peripheral interconnect to which devices can connect. ICH 140 enables interaction of processing core 110 to external devices, including input devices, output devices, displays, disks, etc.

Power supply 150 is coupled to processing core 110 to provide power to processing core 110. A power signal is provided to processing core 110 in the form of a regulated voltage with an associated current. The values of the current and voltage provided by power supply 150 may not be constant. Especially in higher-performance processors or central processing units (CPUs), the operation of processing core 110 may be constrained power limitations. Thus, average power could be limited to a certain number of Watts. To observe the power constraints and achieve the highest performance possible, power supply 150 can provide different voltage and current levels according to a need of processing core 110.

Power supply 150 provides power 112 to processing core 110 and/or to other processing elements or chipset elements (e.g., MCH 120, ICH 140). Power supply 150 receives control and/or configuration information over control interconnect 114, which may be a signal bus. In one embodiment, power supply 150 adjusts power 112 in response to control information received over control interconnect 114. Control interconnect 114 can provide a signal bus to digitally transmit control information to power supply 150. Control interconnect 114 may include one or more signal lines or one or more buses. The interconnect may be a signal interconnect already available in system 100, or may be specially designed to carry the digital configuration information. Not all interconnects represented by 114 are necessarily connected to all devices shown in FIG. 1. Thus, for example, data provider 160 and ICH 140 may have an interconnect over which to pass configuration parameters separate from an interconnect over which data can be passed from ICH 140 to, e.g., power supply 150. In one embodiment, interconnect 114 is a configuration bus for passing configuration information to power supply 150. The providing of digital information to power supply 150 allows power supply 150 to be optimally customized to work in the target environment. This is particularly important when power supply 150 is a standardized component, with a wide range of configurability.

Control interconnect 114 may be coupled to processing core 110, ICH 140, power supply 150, and data provider 160. Data provider 160 represents one or more components, which may reside as separate elements on system 100, or may be incorporated into one or more other elements of system 100 (especially processing core 110 and ICH 140). Data provider 160 may represent multiples of the same or similar components available in multiple parts of system 100. For example, in one embodiment, both processing core 110 and ICH 140 include elements that could be considered a data provider. Data provider 160 includes digital output logic 162 to provide a digital signal, or a digital representation of configuration parameters passed to a voltage regulator controller. In one embodiment, the voltage regulator controller resides in power supply 150. In one embodiment, the voltage regulator controller is integrated into processing core 110, or a microprocessor of which processing core 110 is a part. In embodiments where the voltage regulator controller resides in a standardized microprocessor, there would generally be a need to deliver platform specific customization information from the system to the voltage regulator controller.

Storage 170 in coupled to data provider 160, and stores configuration parameter 172. Configuration parameter 172 represents one or more values or fields stored in storage 170. The values can be constant values that act as variables for controlling the output of power supply 150. Examples of the types of values that can be stored include, but are not limited to, voltage regulator switching frequency, phase information, proportional integral differential control information, advanced feature information, platform specific information (i.e., values related to a specific system that might be different for other system implementations), frequency response information, etc. Storage 170 can be any type of non-volatile storage (e.g., Flash, read-only memory (ROM), disk drive), or persistent or other long-term memory (e.g., battery-backed random access memory (RAM)) wherein one or more configuration parameters are stored. In one embodiment, storage 170 represents multiple separate devices, whether physically or logically separate or both. Data provider 160 retrieves one or more configuration parameters 172 from storage 170 and provides the configuration parameter(s) in digital form to the voltage regulator controller over control interconnect 114.

Figure 2:
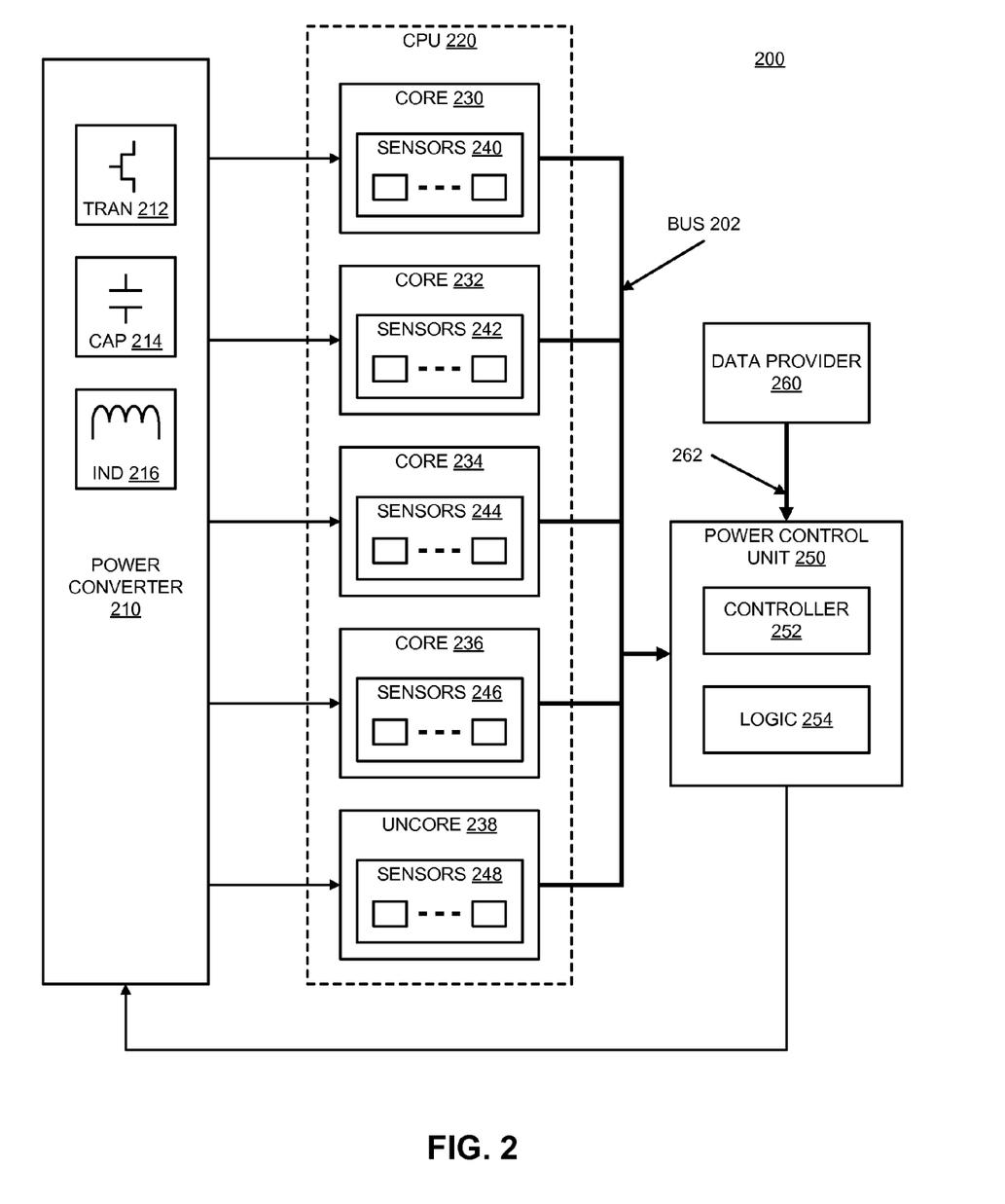
FIG. 2 is a block diagram of an embodiment of a multi-core processor coupled to a power control unit and a power converter.

FIG. 2 is a block diagram of an embodiment of a multi-core processor coupled to a power control unit and a power converter. System 200 represents an example embodiment of system 100 of FIG. 1. System 200 includes CPU 220 having multiple cores, 230-236, which represent processing cores. Cores 230-236 include sensors 240-246, respectively, which represent one or more circuits that provide information. Each core may include multiple sensors. Cores 230-236 are coupled to bus 202, which represents a bus over which to provide a digital representation of the sensor information to power control unit 250. Bus 202 refers to any form of multi-signal interconnect. Bus 202 could be a point-to-point or multi-drop interconnect. Bus 202 can couple two or more integrated circuits (ICs), two or more IC chips, etc. The sensors can provide any of a variety of information regarding the performance of their respective cores. In one embodiment, core 230, a circuit on core 230, or a sensor or a circuit on a sensor provides information obtained by the observations of sensors 240-246. Thus, for example, sensors 240 of core 230 observe the performance or behavior of one or more aspects of core 230, and a digital representation of the information is prepared to transmit/send over bus 202 to power control unit 250. Such information can be used by power control unit 250 to adjust an output of power control unit 250 to power converter 210.

Examples of the types of information available include, but are not limited to: phase information, for example, phase time, phase count, and/or phase clip percentage; proportional integral differential (PID) control information, for example, PID coefficients and/or PID gain adjust information; advanced processor features (e.g., CURRENT SURGE CANCELLATION (CSC) information for the CURRENT SURGE CANCELLATION (CSC) capability available from Intel Corporation), for example, enable or disable the feature and/or feature constants (e.g., constants can be CSC increment size, decay time constant, bandpass coefficient, loadline gain to a ring oscillator (RO) count); platform specific information, for example, per platform margin adjust percentage, inductor size, motherboard loadline resistance, thermal averaging constant (i.e., $T_j$ filter bandwidth); frequency response information, for example, open or closed loop ramp rates, settling (i.e., dwell) time, frequency limits for single phase mode, low pass frequency. Other information could be passed as well. The specified types of information are discussed in more detail below.

Each item of information could be retrieved from a non-volatile storage within system 200 by data provider 260 and provided digitally to power control unit 250 over digital interconnect 262. Digital interconnect 262 represents an example of a bus, similar to bus 202. In one embodiment, digital interconnect 262 is a Product Environmental Control Interface (PECI) bus. The PECI bus allows on- or off-chip management engines and/or controllers to access information from the CPU. Although traditional application of the PECI bus provided for transmission of thermal data, the bus could be used by the CPU or processor to pass information to other controllers (e.g., the voltage regulator controller).

Phase information can include phase time, phase count, or phase clip percentage, or some combination. Phase time provides a switching frequency at which the power supply operates (e.g., 300-1200 kHz). In one embodiment, phase time is provided as a value that represents a number of clock cycles of the clock from which the voltage regulator controller derives its timing information. Phase count can provide a number of phases of a multi-phase voltage regulator. Phase clip percentage refers to percentage of phase clip tolerance.

PID information can include PID coefficients or PID gain, or a combination. These may be linked and one may indicate the other. PID coefficients provide control inputs for a PID block that filters an output of logic 254 of power control unit 250. The output of logic 254 affects the regulated voltage output of power converter 210 based on the PID processing. PID gain can also be affected by the PID coefficients. In one embodiment, certain coefficients, or certain information is passed to allow logic 254 to set PID gain.

CSC information can include enabling/disabling the feature or passing CSC constants, which may include increment size, decay time constant, bandpass coefficient, loadline gain to an RO count. Other advanced features may be included as applicable. CSC refers to a system provide extra current pulses to provide rough balancing of current in and current out of a voltage regulator to reduce output voltage ripple/drop. Of the constants, increment size indicates a size of one or more additional pulses fired. Decay time constants, bandpass coefficients, and loadline gain to an RO count indicate features of the system to determine when and how to provide additional pulses. Such constants can provide information to predict voltage drop due to a current spike to allow the system to fire the pulses to reduce the predicted voltage drop.

Platform specific information can include per platform margin adjust percentage, inductor size, motherboard loadline resistance, or thermal averaging constant, or some combination. Per platform margin adjust percentage can indicate actual implementation details regarding guardbands and loadlines that indicate how the power supply of the specific system provides a regulated output to the processing elements. Inductor size indicates a value of inductance used in the power supply, which can affect the size of pulse to fire from a pulsewidth modulator in the power control unit. Motherboard loadline resistance indicates the effective resistance of the switching and power delivery circuits that account for the loadline of the processing core(s). Motherboard loadline resistance can be a product of motherboard processing and component selection, and should have a default value. Thermal averaging constant information provides $T_j$ filter bandwidth information to the power supply to allow the power control unit to account for thermal effects.

Frequency response information can include loop ramp rate controls, settling (i.e., dwell) time, frequency limits for single phase mode, or low pass frequency, or some combination. Loop ramp rates can indicate open loop rates (e.g., for soft start) and closed loop rates (e.g., for normal ramp up and/or down), and is a product of component selection and motherboard layout. Settling or dwell time provides a value that indicates a response time for the power supply circuitry to settle at a desired voltage (i.e., ripple falls within a certain percentage of the total voltage). Frequency limits indicate for a single phase mode a range of operating frequency is acceptable to produce the desired output voltage. Low pass frequency can indicate a corner frequency on a low pass filter, based on the components and design of the filter.

The information may be generated as analog information that then could be converted to a digital representation. In one embodiment, sensors generate the information digitally (i.e., the output of the sensor is the digital representation and further digital conversion is not necessary). In one embodiment, bus 202 represents a bus available within system 200 that can be leveraged to send additional digital information to power control unit 250. Bus 202 is external to CPU 220. For example, bus 202 could be a PECI bus. In one embodiment, bus 202 is a custom bus.

In one embodiment, power control unit 250 resides on the same die or the same microchip on which CPU 220 resides. Thus, a single integrated circuit chip (IC) can include a processor and an integrated voltage regulator. Certain bulk components (e.g., capacitors, inductors, power transistors) may be connected off the chip; however, the control portion of the power supply can be integrated. Integrating the power supply controls provides more exact control of the voltage, which can be more particularly matched for the particular platform on which it resides than is traditionally possible.

Power control unit 250 includes controller 252, which represents a voltage regulator (VR) controller. Controller 252 may be implemented as a microcontroller that includes code (i.e., firmware) to execute control functions. The code can be updated after installation of power control unit 250 (whether as an embedded circuit on the same die as CPU 220, or whether external) to affect the control functionality. Controller 252 receives configuration information (i.e., the parameters) sent over bus 202 to determine how to regulate a power output to CPU 220, or specifically to one of its elements, as discussed below. In one embodiment, controller 252 selectively applies the received configuration parameters. For example, certain parameters can be ignored in determining how to control the voltage output. In another example, controller 252 may include hardwired constants (e.g., fused values, values stored on an internal ROM or other memory), which may be overwritten based on the received parameters. Thus, parameters could be updated on system 200 and used to overwrite originally-supplied constants. The application of the parameters by controller 252 may be implementation specific for each different platform type or each manufacturer based on its processes.

Controller 252 thus generates an output signal that indicates a power output in accordance with the input parameters received from cores 230-236. Power control unit 250 also includes logic 254, which represents one or more circuits that provide the ability to generate an output pulse or series of pulses to generate an output power signal in accordance with the parameters and with the output signal from controller 252. Logic 254 receives the parameters and the output signal from controller 252 as inputs to generate a control signal that controls the operation of power converter 210.

Power converter 210 includes circuitry to generate the power signal to CPU 220. Power converter 210 may include circuitry that regulates a direct current (DC) voltage obtained from a transformer down to a signal suitable for use by CPU 220. Power converter 210 includes one or more of each power component including transistor 212, capacitor 214, and inductor 216. Transistor 212 is a power transistor that can act as a switched gate to provide power to CPU 220. Capacitor 214 is generally implemented as one or more electrolytic capacitors, although ceramic capacitors could be used instead of and/or in addition to electrolytic capacitors. In certain implementations, all bulk capacitors may be ceramic or otherwise non-electrolytic. In one embodiment, capacitor 214 and/or inductor 216 include variable aspects and can adjusted to different capacitive or inductive values, respectively. Capacitor 214 and inductor 216 provide filtering of an input signal to affect the shape, rise, fall, smoothness, etc., of a power signal. Capacitor 214 and inductor 216 represent bulk components that are implemented as discrete components and are not integrated onto an IC. In an implementation where power control unit 250 is integrated onto the same IC as CPU 220, power converter 210 represents components that would be provided off-chip.

In one embodiment, power converter 210 includes one or more power transistors 212, one or more bulk capacitors 214, and one or more inductors 216 for each of cores 230-238. Thus, each core can be independently regulated. Each of cores 230-238 includes sensors 240-248 to provide performance parameters to indicate the operation of the cores. The performance parameters are passed over bus 202 to power control unit 250, and can indicate the core to which they apply. Thus, the cores provide core-specific system performance parameters to power control unit 250. The performance information can be passed via scheduled transmissions and/or through polling each core for the performance information. When individual system parameters are indicated, controller 252 and logic 254 output a control signal for the power for the particular core, and a switching transistor in power converter 210 is switched on to allow power to pass to the indicated core.

As described above, each processing core 230-236 includes sensors 240-246 and outputs digital system parameters over bus 202 to power control unit 250. CPU 220 also includes uncore 238, which represents non-processing components (e.g., cache) of CPU 220. In one embodiment, uncore 238 includes one or more elements of a memory controller hub. Alternatively, a memory controller hub can be considered a separate processing core. Uncore 238 includes sensors 248, which may be the same sensors as included in cores 230-236, or fewer or different sensors. As with the processing cores, uncore 238 generates and transmits digital system parameters over bus 202 to power control unit 250 to indicate power consumption behavior. Controller 252 processes the received system parameters to determine power needs of uncore 238, as with the processing cores, and provides an output signal to logic 254. Logic 254 outputs a control signal to power converter 210 to generate a regulated power output signal from an unregulated power source to uncore 238 based on the system parameters.

Figure 3:
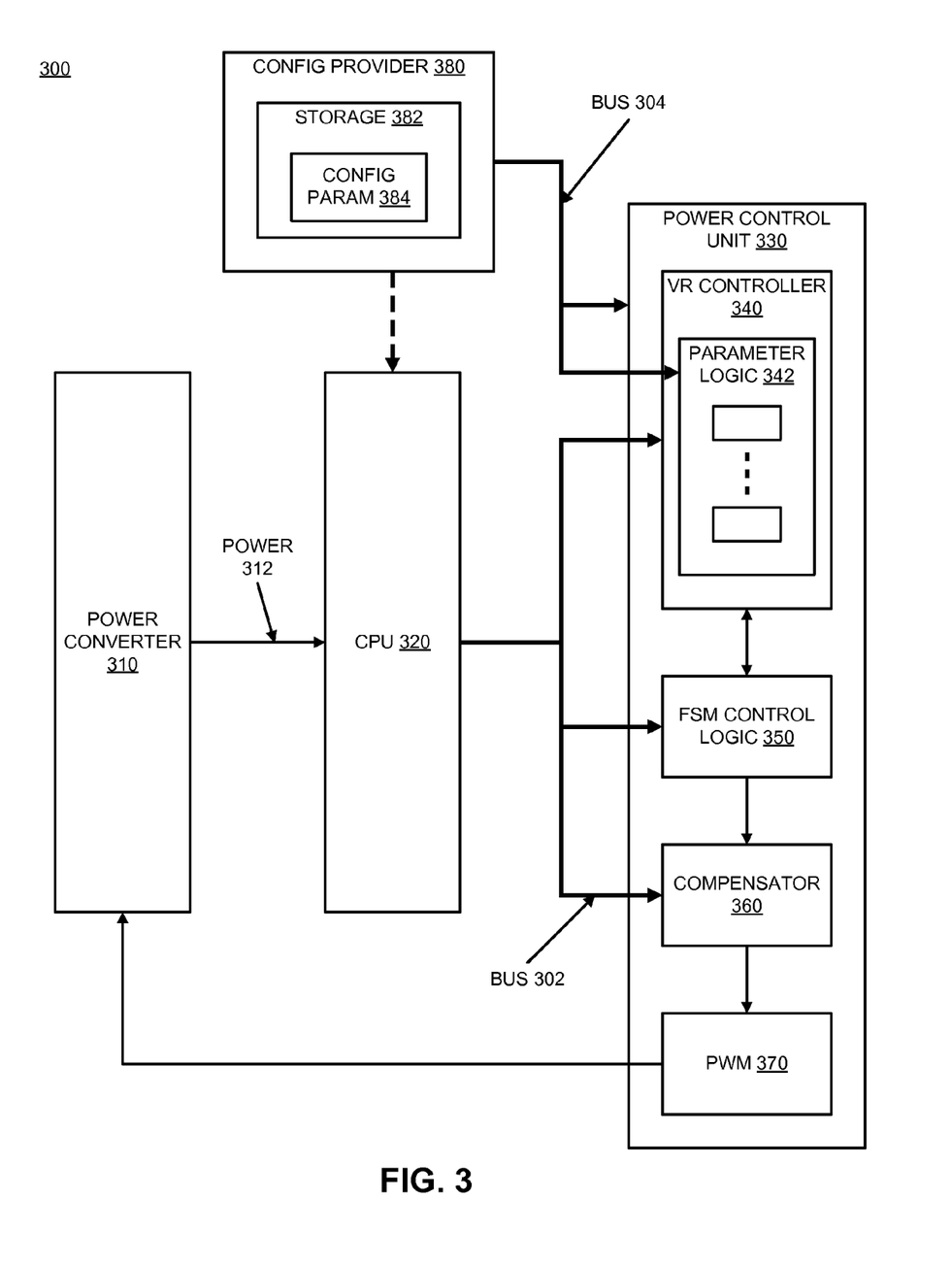
FIG. 3 is a block diagram of an embodiment of a central processing unit coupled to a power control unit and a power converter.

FIG. 3 is a block diagram of an embodiment of a central processing unit coupled to a power control unit and a power converter. System 300 represents an example of a system according to system 100 and/or system 200 of FIGS. 1 and 2, respectively. Power converter 310 represents bulk/power components that regulate an incoming power source (generally a higher voltage than the desired regulated voltage output) to generate regulated power 312. In one embodiment, power converter 310 is a multi-stage power converter. Regulated power 312 provides power as needed by the cores of CPU 320, taking into account higher or lower current needs, as well as adjustments to the operational voltage.

CPU 320 is coupled to bus 302, which represents a bus over which CPU 320 can digitally pass performance information indicating system parameters that affect regulated power signal 312. Configuration provider 380 is coupled to bus 304 over which configuration provider 380 can digitally pass configuration parameters for system information from which power control unit 330 derives control signals to pass to power converter 310. In one embodiment, configuration provider 380 provides the parameters directly to power control unit 330. In another embodiment, configuration provider 380 provides the parameters to CPU 320, which passes the information to power control unit 330. CPU 320 may, for example, process the parameters (e.g., perform error checking).

Configuration provider 380 includes storage 382, and/or has access to storage 382, which represents a non-volatile storage device as described previously. Storage 382 includes configuration parameter 384, which represents one or more configuration parameters, as described previously. Configuration provider 380 represents a data source from which configuration parameters are retrieved. In one embodiment, configuration parameter 380 is a chipset component. In one embodiment, configuration provider 380 is an integrated circuit on CPU 320. In one embodiment, configuration provider 380 represents one or more elements of an ADVANCED MANAGEMENT TECHNOLOGY (AMT) system or an equivalent, such as iAMT available from Intel Corporation. With an AMT system, configuration parameters could be provided from an entity external to system 300 through the AMT system. Thus, storage 382 may represent a storage device that resides externally to system 300.

FIG. 3 provides a more detailed view of a power control unit. Power control unit 330 represents a power control unit or power controller according to any embodiment described herein. Power control unit 330 receives the digital parameter information from CPU 320 and/or configuration provider 380 and generates output signals to power converter 310 to affect the components of power converter 310 to output a power signal that matches the needs of CPU 320. The precise controlling of the power output to CPU 320 based on the digitally received parameters not only provides more efficient performance, but also prolongs the operational lifespan of CPU 320.

Power control unit 330 includes voltage regulator (VR) controller 340. In one embodiment, VR controller 340 is a microcontroller that receives and processes the parameters digitally passed over bus 302. In one embodiment, VR controller 340 includes parameter logic 342 for each different type of parameter, or for each different parameter. Logic 342 represents circuitry for implementations in which the different parameters could be weighted differently or otherwise individually processed to provide voltage control. In one embodiment, logic 342 represents a configuration processing engine that produces a voltage control output based on the received configuration parameters.

Power control unit 330 also includes finite state machine (FSM) 350, compensator 360, and pulsewidth modulator (PWM) 370. FSM 350 provides one or more FSMs to control various voltage control parameters and/or control various cores. FSM 350 provides different output depending on a state determined for specific parameters. Compensator 360 receives a target voltage from FSM 350 and compares the target voltage against an actual voltage received from the core that is the subject of the particular state. Compensator 360 generates an error term for a negative feedback loop to drive the error to zero. PWM 370 generates pulse signals to control current in the components of power converter 310 based on the output of compensator 360. The frequency of the pulses affects the switching of power transistors (e.g., field effect transistors (FETs)) at one or more stages of power converter 310. The frequency of the pulses driving the components of power converter 310 affects the current and/or voltage of power signal 312 output by power converter 310.

Figure 4:
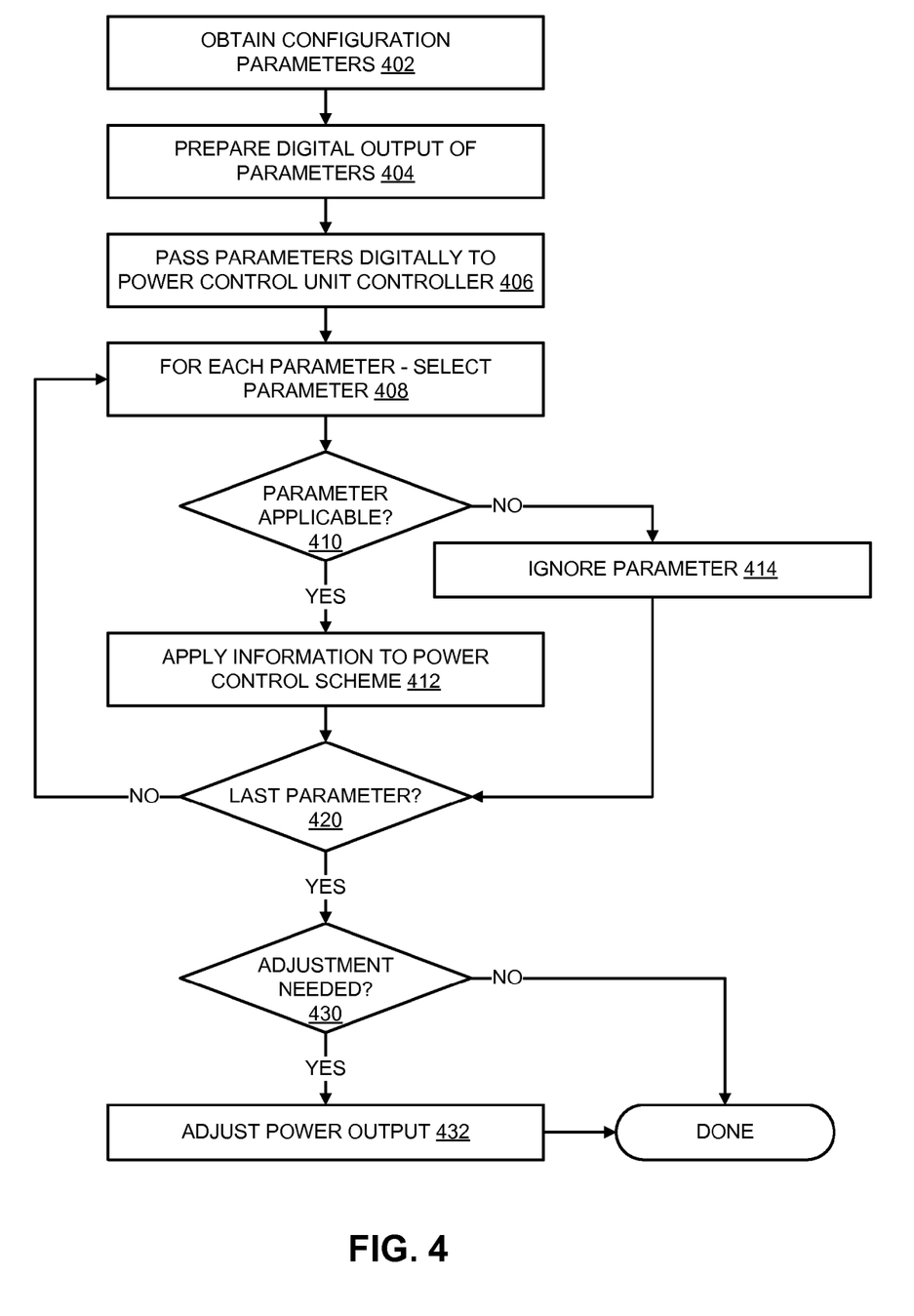
FIG. 4 is a flow diagram of an embodiment of regulating a voltage according to received regulation configuration information.

FIG. 4 is a flow diagram of an embodiment of regulating a voltage according to received regulation configuration information. A configuration or data source obtains configuration parameters, 402. The parameters are stored in a non-volatile storage or persistent memory location on or off the system, and indicate system-specific parameters that can be provided, for example, by a manufacturer of the system. The configuration parameters provide information related to providing a regulated power output to one or more system cores. The core may be a processing core, or a combination of non-processing elements/components. The data source prepares the parameters in a digital output representation of the configuration parameters, 404. The data source passes the parameters digitally to a power control unit controller, and potentially to other components of a power control unit, 406.

In one embodiment, each parameter is passed separately and stored in an individual register. In one embodiment, all parameters are sent as a stream and separated at the power control unit. For each parameter, the parameter is selected, 408, and the power controller unit controller determines whether the parameter is applicable. In one embodiment, determining whether the parameter is applicable may include determining whether to apply a default or a received parameter. Code that directs the operation of the controller can indicate a power control scheme and indicate how to determine whether a parameter is applicable, and/or how to apply parameters. In one embodiment, a parameter application algorithm executed by the controller can determine to ignore certain parameters based on ranges or values of other configuration parameters (e.g., based on system configuration/design). The code can be modified to affect operation of the power control unit. Thus, different power control processes can be used and attempted to determine a more optimized power control scheme.

If the parameter is applicable, 410, the parameter information is applied to a power control scheme, 412. The power control scheme includes applying one or more algorithms by the controller to the parameter information to generate a voltage control output signal. If the parameter is not applicable, 410, the parameter may be ignored, 414, or its value does not affect the output control signal that indicates how power is to be regulated. Thus, a regulated voltage may be based on one or more parameters digitally provided to the power control unit.

If the last parameter has not been accounted for, 420, another parameter is selected and the parameter applied to the voltage regulation scheme. When the last parameter has been accounted for, 420, control logic (e.g., FSM and compensator) determines whether an adjustment to a power output is needed, 430.

A flow diagram as illustrated herein provides an example of a sequence of various operations. Although shown in a particular sequence or order, unless otherwise specified, the order of the operations can be modified. Thus, the illustrated implementations should be understood only as examples, and operations can be performed in a different order, and some operations may be performed in parallel.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A processor system, comprising:
    a processor having a plurality of cores situated on a semiconductor die;
    a voltage regulator module to provide voltages to the plurality of cores in the processor;
    at least one sensor to obtain information on at least one of the plurality of cores, the information including thermal condition of a core;
    at least one analog to digital converter to convert the information obtained by the sensor to a digital format; and
    a power controller, coupled to the voltage regulator module and situated on the semiconductor die, to provide control information to the voltage regulator module based at least in part on the digitized information obtained by the sensor;
    wherein the voltage regulator module varies at least one voltage of the voltages provided to the plurality of cores based at least in part on the control information provided by the power controller;
    wherein the power controller further determines that no changes of a voltage to a core is necessary if an actual output voltage to the core is substantially the same as a voltage expected by the core based on the control information.

2. The processor system of claim 1, wherein the voltage regulator module varies the actual output voltage dynamically over time under the control of the power controller in response to a difference the power controller detects between the actual voltage and an expected output voltage of the voltage regulator module.

3. The processor system of claim 1, wherein the power controller receives a plurality of configuration parameters for the voltage regulator module including the digitized information obtained by the sensor, and provides the control information to the voltage regulator module based at least in part on the plurality of configuration parameters.

4. The processor system of claim 3, wherein the plurality of configuration parameters further comprise one or more of type III compensator coefficients, a power limit, a current limit, a loadline resistance value, a number of phases, an advanced feature enable code, or a direct current setpoint adjust.

5. The processor system of claim 3, further comprising a storage device to store the plurality of configuration parameters.

6. The processor system of claim 3, further comprising a digital interconnect coupled to the power controller, the plurality of configuration parameters being digitally transmitted to the power controller.

7. The processor system of claim 1, wherein the power controller throttles at least one core of the processor if the processor consumes more than a pre-determined threshold power, and places the processor in a power throttled mode.

8. The processor system of claim 1, wherein the power controller instructs the voltage regulator module to reduce the actual output voltage when the processor enters an inactive state.

9. A power control method, comprising:
supplying, by a voltage regulator module, voltages to a processor, the processing having a plurality of cores;
sensing information on at least one of the plurality of cores, the information including thermal condition of a core;
converting the sensed information to a digital format;
providing control information to the voltage regulator module based at least in part on the digitized sensed information;
varying at least one voltage of the voltages supplied to the plurality of cores based at least in part on the control information; and
determining that no changes of a voltage to a core is necessary if an actual output voltage to the core is substantially the same as a voltage expected by the core based on the control information.

10. The method of claim 9, further comprising varying, by the voltage regulator module, the actual output voltage dynamically over time under direction of the control information in response to a difference between the actual voltage and an expected output voltage of the voltage regulator module.

11. The method of claim 9, further comprising receiving a plurality of configuration parameters for the voltage regulator module including the digitized sensed information, and providing the control information to the voltage regulator module based at least in part on the plurality of configuration parameters.

12. The method of claim 11, further comprising determining whether each of the plurality of configuration parameters is applicable for a processing core.

13. The method of claim 9, further comprising throttling at least one core of the processor if the processor consumes more than a pre-determined threshold power, and placing the processor in a power throttled mode.

14. The method of claim 9, further comprising reducing the actual output voltage of the power regulator module when the processor enters an inactive state.

15. An information handling system, comprising:
a processor having a plurality of cores situated on a semiconductor die;
a memory coupled to the processor; and
a power system, coupled to the processor, to supply power to the processor, the power system including:
at least one sensor to obtain information on at least one of the plurality of cores, the information including thermal condition of a core;
at least one analog to digital converter to convert the information obtained by the sensor to a digital format;
a power controller, situated on the semiconductor die, to generate control information based at least in part on the digitized information obtained by the sensor; and
a voltage regulator module, coupled to the power controller and the processor, to provide voltages to the plurality of cores, the voltage regulator module varying at least one voltage of the voltages provided based at least in part on the control information provided by the power controller;
wherein the power controller further determines that no changes of a voltage to a core is necessary if an actual output voltage to the core is substantially the same as a voltage expected by the core based on the control information.

16. The system of claim 15, wherein the voltage regulator module varies the actual output voltage dynamically over time under the control of the power controller in response to a difference the power controller detects between the actual voltage and an expected output voltage of the voltage regulator module.

17. The system of claim 15, wherein the power controller receives a plurality of configuration parameters for the voltage regulator module including the digitized information obtained by the sensor, and provides the control information to the voltage regulator module based at least in part on the plurality of configuration parameters.

18. The system of claim 17, further comprising:
a storage device to store the plurality of configuration parameters; and
a digital interconnect coupled to the power controller to pass the plurality of configuration parameters from the storage device to the power controller.

19. The system of claim 15, wherein the power controller throttles at least one core of the processor if the processor consumes more than a pre-determined threshold power, and places the processor in a power throttled mode.

20. The system of claim 15, wherein the power controller instructs the voltage regulator module to reduce the actual output voltage when the processor enters an inactive state.

* * * * *